(12) United States Patent
Lamontia et al.

(10) Patent No.: US 9,370,970 B2
(45) Date of Patent: Jun. 21, 2016

(54) TIRE CONTAINING NOISE REDUCING FIBROUS LAYERS

(71) Applicant: E I DU PONT DE NEMOURS AND COMPANY, Wilmington, DE (US)

(72) Inventors: Mark Allan Lamontia, Landenberg, PA (US); Derya Gulsen Onbilger, Midlothian, VA (US); Brian R France, N. Chesterfield, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 211 days.

(21) Appl. No.: 14/084,699

(22) Filed: Nov. 20, 2013

(65) Prior Publication Data

US 2015/0136294 A1    May 21, 2015

(51) Int. Cl.
| | |
|---|---|
| *B29D 30/06* | (2006.01) |
| *B29D 30/16* | (2006.01) |
| *B29D 30/70* | (2006.01) |
| *B60C 9/26* | (2006.01) |
| *B60C 9/20* | (2006.01) |
| *B60C 9/18* | (2006.01) |
| *B60C 9/22* | (2006.01) |
| *B29D 30/30* | (2006.01) |

(52) U.S. Cl.
CPC .............. *B60C 9/26* (2013.01); *B29D 30/3028* (2013.01); *B29D 30/70* (2013.01); *B60C 9/185* (2013.01); *B60C 9/2009* (2013.04); *B60C 9/22* (2013.01); *B60C 2009/2012* (2013.04)

(58) Field of Classification Search
CPC .... B29D 30/00; B29D 30/16; B29D 30/1628; B29D 30/30; B29D 30/3028; B29D 30/38; B29D 30/70
See application file for complete search history.

(56) References Cited

U.S. PATENT DOCUMENTS

| | | | |
|---|---|---|---|
| 3,063,966 A | | 11/1962 | Kwolek |
| 3,094,511 A | | 6/1963 | Hill, Jr. et al. |
| 3,227,793 A | | 1/1966 | Cipriani |
| 3,287,324 A | | 11/1966 | Sweeny |
| 3,354,127 A | | 11/1967 | Hill, Jr. et al. |
| 3,414,645 A | | 12/1968 | Morgan, Jr. |
| 3,673,143 A | | 6/1972 | Bair et al. |
| 3,767,756 A | | 10/1973 | Blades |
| 3,819,587 A | | 6/1974 | Kwoleck |
| 3,869,429 A | | 3/1975 | Blades |
| 3,869,430 A | | 3/1975 | Blades |
| 4,172,938 A | | 10/1979 | Mera et al. |
| 4,173,991 A | * | 11/1979 | Mirtain ................. 152/209.8 |
| 5,667,743 A | | 9/1997 | Tai et al. |
| 2009/0301627 A1 | * | 12/2009 | Manno ................ B60C 9/2006 152/527 |

FOREIGN PATENT DOCUMENTS

| | | | |
|---|---|---|---|
| DE | 2518223 | * | 11/1976 |
| GB | 2162471 | * | 2/1986 |

(Continued)

OTHER PUBLICATIONS

TireTerms,Tire Litigation.com pp. 13.

(Continued)

*Primary Examiner* — Justin Fischer

(57) ABSTRACT

A pneumatic tire comprises an overlay wherein the overlay is positioned above the belt plies but beneath the tread, and at least one overlay end is folded and extends inwards toward the center line of the tire.

1 Claim, 4 Drawing Sheets

(56) References Cited

FOREIGN PATENT DOCUMENTS

| | | | |
|---|---|---|---|
| GB | 2163709 | * | 3/1986 |
| JP | 54-107003 | * | 8/1979 |

OTHER PUBLICATIONS

Gemini Automotive care, Basic tire Construction/About Tires/ Tires & Tire Services. pp. 1-2.

* cited by examiner

TIRE CONTAINING NOISE REDUCING FIBROUS LAYERS

BACKGROUND

Field of the Invention

This invention pertains to a load bearing or a non-load bearing noise-reducing fibrous overlay layer suitable for use in vehicle tires. The tires may be used in, for example, automobiles.

SUMMARY OF THE INVENTION

This invention pertains to a pneumatic tire comprising an overlay wherein, (i) the overlay is positioned above the belt plies but beneath the tread, and (ii) at least one overlay end is folded and extends inwards toward the center line of the tire.

The invention also pertains to a method of forming a folded overlay.

DETAILED DESCRIPTION

Tire Components

Figure 1:
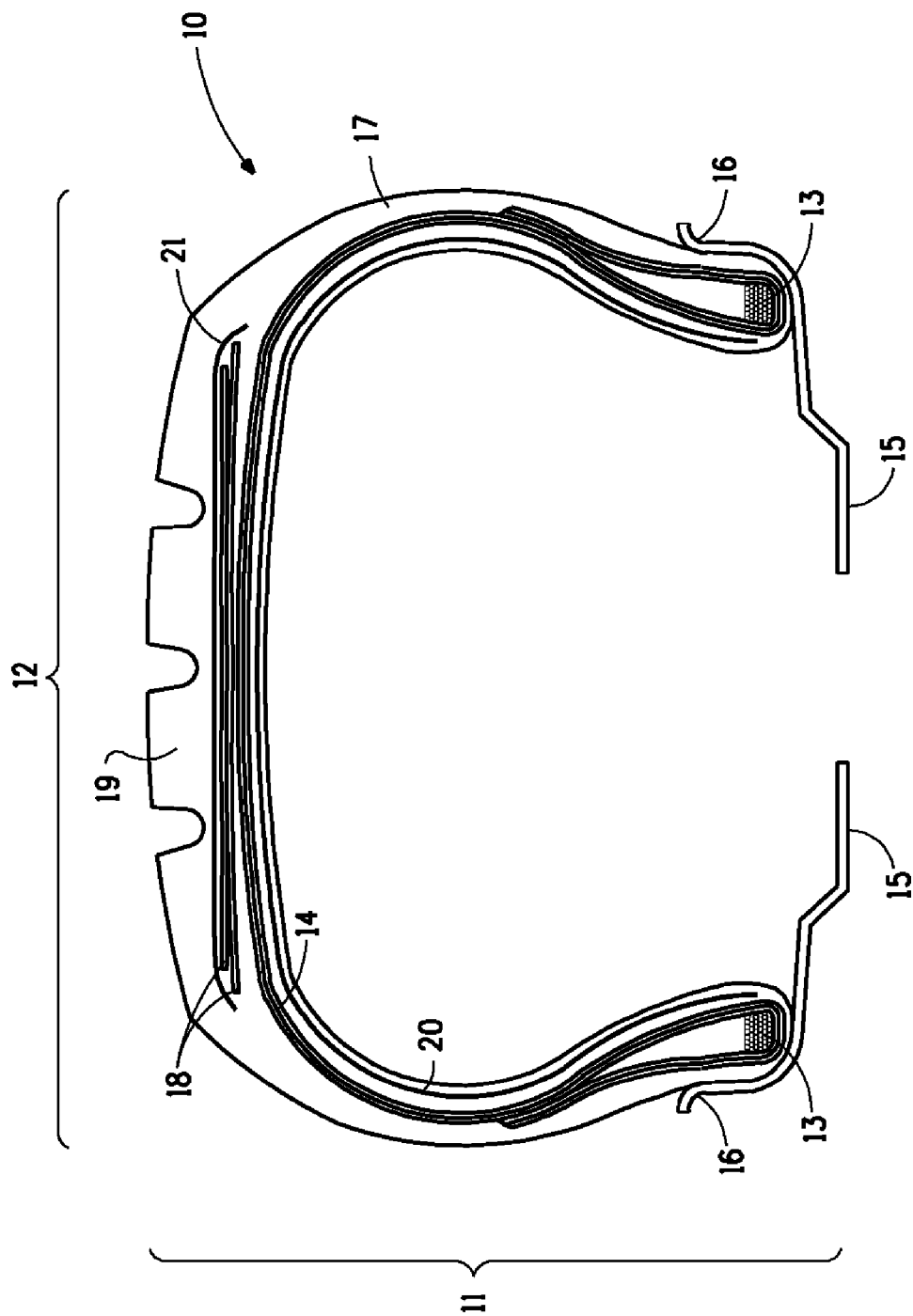
FIG. 1 shows a cross-section of a vehicle tire as known in the art.

Shown generally at 10 in FIG. 1 is a cross-section of a tire comprising two principal sections, a sidewall section 11 and a crown section 12. A tire sidewall is the area between the tire bead and the tread. "Crown" means that portion of the tire within the width limits of the tire tread. An inner liner 20 is a thin layer of rubber on the inside of the tire to contain the compressed air when the tire is inflated. Beads 13 are located where the tire sits on the rim. Bead means that part of the tire comprising an annular tensile member wrapped by ply cords and shaped, with or without other reinforcement elements such as flippers, chippers, apexes, toe guards, and chafers, to fit the wheel rim. Some tires comprise a plurality of beads. Carcass cords 14 provide load bearing capabilities to the tire. Carcass means the overall tire structure that the belt structure, tread, undertread, and sidewall rubber is added to. A carcass is sometimes called a casing. Carcass reinforcements are sometimes called plies, and some tires comprise a plurality of carcass plies. The carcass cords are anchored by wrapping them around the bead wires 13. The inner liner 20 is adhered to the inside of the carcass. A belt 18 is a narrow layer of tire cord material above the carcass in the crown of the tire. Most tires comprise at least two belts. In truck tires, belts are sometimes called breakers. An overlay 21 is a layer or layers positioned above the belts 18 but below the tread 19. Also shown in FIG. 1 are wheel rims 15. The rims have flanges 16. "Tread" means that portion of a tire that comes into contact with the road when the tire is normally inflated and under normal load. The sidewall rubber layer is shown at 17.

Folded Overlay

Figure 2:
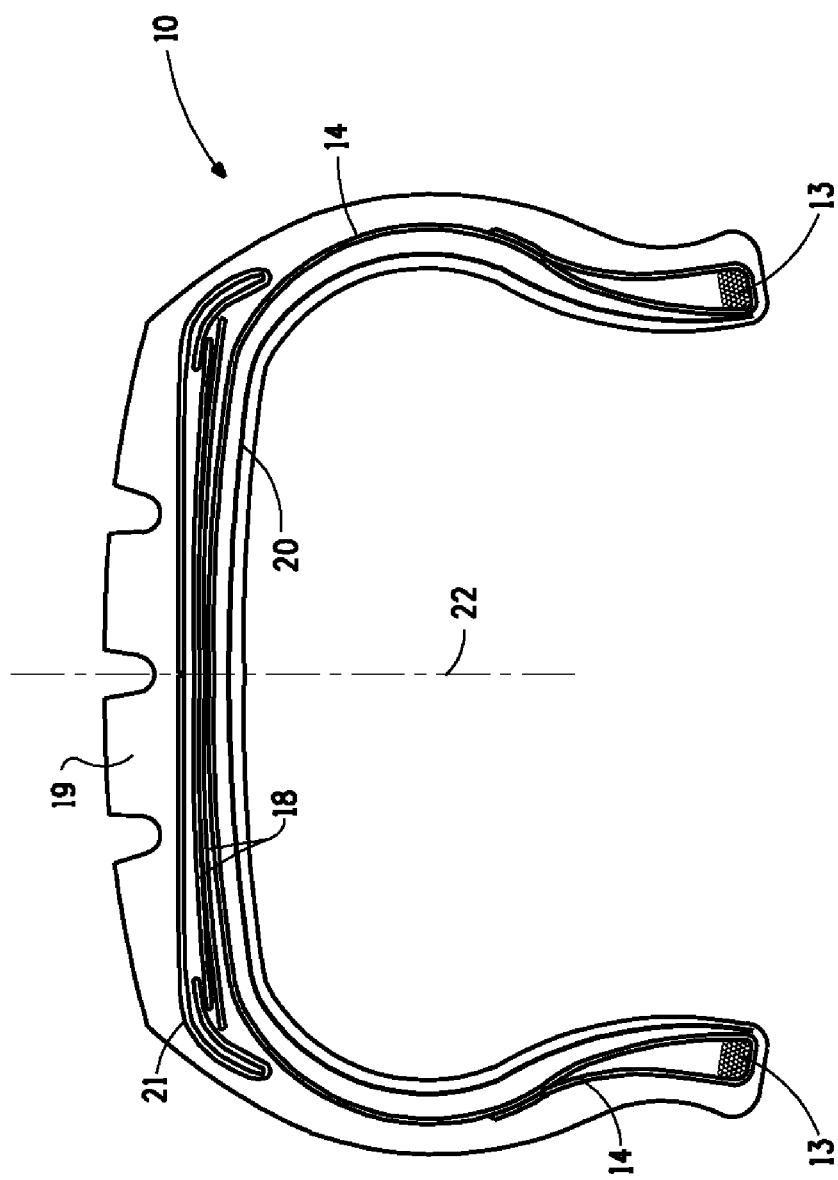
FIG. 2 shows a cross-section of a vehicle tire showing a folded overlay.
Figure 3A:
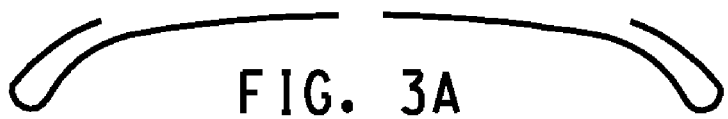
FIGS. 3A to 3C show alternative configurations of folded overlay plies.
Figure 3B:
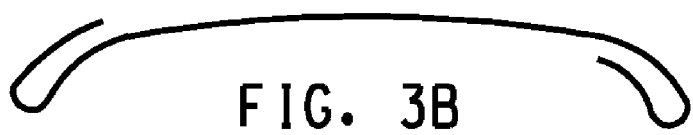
Figure 3C:
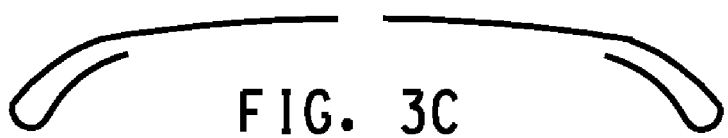

FIG. 2 shows an overlay 21 of this invention positioned above the plurality of belt plies 18 but beneath the tread 19. An end, and preferably both ends of the overlay are folded to extend back inwards toward the center line of the tire 22. FIGS. 3A to 3C show some alternative arrangements with respect to the folding of the ends of the overlay fold. In FIG. 3A, both ends are folded back above the main length of the overlay. In FIG. 3B, one end is folded back below the main length of the overlay and the other is folded back above the main length of the overlay. In FIG. 3C both ends are folded below the main length of the overlay. FIGS. 3A and 3C show a split ply whereas FIG. 3B shows a continuous ply. In embodiments where there are a plurality of folded overlay plies, combinations of folds other than those described herein may also be utilized.

Yarns of the Component Plies

In some embodiments, the carcass ply, belt ply, floater, flipper, chipper, and overlay layers comprise polymeric yarns. The yarns comprise a plurality of continuous filaments. In some other embodiments steel may be used in the carcass or as belt plies. For purposes herein, the term "filament" is defined as a relatively flexible, macroscopically homogeneous body having a high ratio of length to width across its cross-sectional area perpendicular to its length. The filament cross-section can be any shape, but is typically circular, oval, or bean-shaped. The filaments may be formed into a yarn comprising a plurality of filaments. Multifilament yarn spun onto a bobbin in a package contains a plurality of continuous filaments. Load bearing layers comprise continuous filaments. However for non-load bearing layers such as a floater, staple fiber may be used as an alternative to continuous filaments. Hybrid fiber such as a sheath-core fiber may also be used in the floater component. Hybrid yarns also take the form of plied or merged yarn in which filaments of different polymer or of different denier are twisted together. A core insertion hybrid yarn is one in which a yarn of one type is surrounded by yarns of a different type. The multifilament yarn can be cut into staple fibers The staple fiber can have a length of about 0.4 inches to about 5 inches (about 1.0 cm to about 12.7 cm) or even of about 1.5 inches (3.8 cm) to 2.5 inches (6.3 cm). The staple fiber can be straight (i.e., non crimped) or crimped to have a saw tooth shaped crimp along its length, with a crimp (or repeating bend) frequency of about 3.5 to about 18 crimps per inch (about 1.4 to about 7.1 crimps per cm).

The yarns have a tenacity of at least 7.3 grams per dtex and a modulus of at least 100 grams per dtex. Preferably, the yarns have a linear density of 50 to 4500 dtex, a tenacity of 10 to 65 g/dtex, a modulus of 150 to 2700 g/dtex, and an elongation to break of 1 to 8 percent. More preferably, the yarns have a linear density of 100 to 3500 dtex, a tenacity of 15 to 50 g/dtex, a modulus of 200 to 2200 g/dtex, and an elongation to break of 1.5 to 5 percent.

The yarns can be intertwined and/or twisted. The yarns are formed into a cord or a fabric. A tire cord is a twisted or formed structure composed of two or more yarns or filamentary strands. Cords are well known in the tire construction industry. A cord may comprise one or more filaments or yarns. When a cord comprises a plurality of filaments or yarns, then they may be intertwined (helically wound) with each other. In some embodiments, the filaments or yarns are intertwined at a helical angle of from about four to forty degrees. The filament sor yarns within a load bearing layer are oriented substantially in the same direction. In some layers, a light yarn may be oriented in a direction such as orthogonal to the main yarn direction in order to provide some stability to the layer of fibers. A non-load bearing layer may also be in the form of a woven or knitted fabric. A "knitted" fabric is a fabric produced by interlooping one or more ends of yarn. The term "woven" is meant herein to be any biaxial fabric that can be made by weaving; that is, by interlacing or interweaving at least two yarns typically at right angles.

The yarns comprise filaments that are either naturally flame retardant or rendered flame retardant by the addition of flame retardant additives. For synthetic fibers, such additives are typically added into the polymer prior to spinning. For natural fibers, the additives are coated onto the fiber surface. A fiber is generally deemed to be naturally flame retardant if it has a Limiting Oxygen Index (LOI) of 26 or greater without the addition of any flame retardant chemicals. LOI is the minimum oxygen concentration that will just support flaming combustion in a flowing mixture of oxygen and nitrogen and is measured by techniques such as specified in ASTM D2863. Naturally flame retardant fibers include anisotropic melt polyesters, poly(butylene terephthalate), poly(acrylonitrile butadiene styrene), polyvinylchloride, polysulfone, poly (ether-ether-ketone), poly(ether-ketone-ketone), polyethersulfone, polyarylate, polyphenylsulfone, polyetherimide, polyamide-imide, aromatic polyamide, flame retardant nylon, flame retardant polyester, flame retardant polyolefins and mixtures thereof. In some embodiments of this invention, flame retardant is added to the polymer in the amount of about 10 to 15 percent by weight of the polymer to achieve the desired LOI. In some embodiments, the carcass plies comprise yarns made from aromatic polyamide, aromatic copolyamide, aliphatic polyamide, polyester, rayon, nylon, polyethylene or combinations thereof. In some embodiments, the belt plies comprise yarns made from aromatic polyamide, aromatic copolyamide, aliphatic polyamide, polyester, rayon, nylon, polyethylene, fiberglass, carbon, steel or combinations thereof. In some embodiments, the overlay comprises yarns made from nylon, aramid or combinations thereof. In some embodiments, the floater layer comprises yarns made of aromatic polyamide, aromatic copolyamide, aliphatic polyamide, anisotropic melt polyester, ultra high molecular weight polyethylene or polybenzoxazole. Meta-aramid or para-aramid are preferred aromatic polyamides. Flame retardants may optionally be added to the polymers of the floater layer yarns to render further flame resistance.

In one embodiment aromatic polyamide is a preferred fiber polymer. Preferred aromatic polyamides are meta-aramid (m-aramid) and para-aramid (p-aramid).

The term "aramid" means a polyamide wherein at least 85% of the amide (—CONH—) linkages are attached directly to two aromatic rings. Suitable aramid fibers are described in Man-Made Fibres—Science and Technology, Volume 2, Section titled Fibre-Forming Aromatic Polyamides, page 297, W. Black et al., Interscience Publishers, 1968. Aramid fibers and their production are, also, disclosed in U.S. Pat. Nos. 3,767, 756; 4,172,938; 3,869,429; 3,869,430; 3,819,587; 3,673,143; 3,354,127; and 3,094,511.

The preferred para-aramid is poly(p-phenylene terephthalamide) which is called PPD-T. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloro-terephthaloyl chloride or 3,4'-diaminodiphenylether.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

Methods for making para-aramid fibers are generally disclosed in, for example, U.S. Pat. Nos. 3,869,430; 3,869,429; and 3,767,756. Such aromatic polyamide organic fibers and various forms of these fibers are available from E. I. du Pont de Nemours & Company, Wilmington, Del. (DuPont) under the tradename Kevlar® fibers and from Teijin Ltd. of Tokyo, Japan under the tradename Twaron® fibers. Technora® fiber, also available from Teijin is made from copoly(p-phenylene/3,4'diphenyl ester terephthalamide) and may also be considered a para-aramid fiber.

For non-load bearing layers, meta-aramid fiber may also be used. Meta-aramid fiber means meta-oriented synthetic aromatic polyamide polymers. The polymers can include polyamide homopolymers, copolymers, and mixtures thereof which are predominantly aromatic, wherein at least 85% of the amide (—CONH—) linkages are attached directly to two aromatic rings. The rings can be unsubstituted or substituted. The polymers are meta-aramid when the two rings or radicals are meta oriented with respect to each other along the molecular chain. Preferably copolymers have no more than 10 percent of other diamines substituted for a primary diamine used in forming the polymer or no more than 10 percent of other diacid chlorides substituted for a primary diacid chloride used in forming the polymer. Additives can be used with the aramid; and it has been found that up to as much as 13 percent by weight of other polymeric material can be blended or bonded with the aramid.

The preferred meta-aramids are poly(meta-phenylene isophthalamide) (MPD-I) and its copolymers. One such meta-aramid fiber is Nomex® aramid fiber available from DuPont, however, meta-aramid fibers are available in various styles under the trademarks Conex®, available from Teijin Ltd. of Tokyo, Japan; Apyeil®, available from Unitika, Ltd. of Osaka, Japan; New Star® meta-aramid, available from Yantai Spandex Co. Ltd, of Shandong Province, China; and Chinfunex® Aramid 1313 available from Guangdong Charming Chemical Co. Ltd., of Xinhui in Guangdong, China. Meta-aramid fibers are inherently flame resistant and can be spun by dry or wet spinning using any number of processes; however, U.S. Pat. Nos. 3,063,966; 3,227,793; 3,287,324; 3,414,645; and 5,667,743 are illustrative of useful methods for making aramid fibers that could be used.

Another suitable fiber is one based on aromatic copolyamide such as is prepared by reaction of terephthaloyl chloride (TPA) with a 50/50 mole ratio of p-phenylene diamine (PPD) and 3,4'-diaminodiphenyl ether (DPE). Yet another suitable fiber is that formed by polycondensation reaction of two diamines, p-phenylene diamine and 5-amino-2-(p-aminophenyl) benzimidazole with terephthalic acid or anhydrides or acid chloride derivatives of these monomers.

By nylon it is meant fibers made from aliphatic polyamide polymers. Such polymers include polyhexamethylene adipamide (nylon 66), polycaprolactam (nylon 6), polybutyrolactam (nylon 4), poly(9-aminononanoic acid) (nylon 9), polyenantholactam (nylon 7), polycapryllactam (nylon 8), polyhexamethylene sebacamide (nylon 6, 10), and the like. It is known that the fire retardancy of some nylon compositions may be enhanced by the incorporation therein of various chlorinated organic fire retardants, often in combination with a suitable metal oxide, such as a zinc, iron or antimony oxide. A particularly effective fire retardant for Nylon 6 and Nylon 66 is bis(hexachlorocyclopentadieno)cyclooctane. The incorporation of bis(hexachlorocyclopentadieno)cyclooctane, optionally in combination with a suitable metal oxide, in nylon compositions, is disclosed in U.S. Pat. No. 3,403,036 to Hindersinn et al. It is known that such nylon compositions are characterized by excellent fire retardant properties and are generally satisfactory to excellent with respect to most of the desired physical properties sought in nylon compositions.

In one embodiment, a preferred polyester is polyethylene naphthalate (PEN). In some other embodiments, a preferred flame retardant polyester polymer is flame retardant polyethylene terephthalate (FR PET) or flame retardant polyethylene naphthalate (FR PEN). These polymers may include a variety of comonomers, including diethylene glycol, cyclohexanedimethanol, poly(ethylene glycol), glutaric acid, azelaic acid, sebacic acid, isophthalic acid, and the like. In addition to these comonomers, branching agents like trimesic acid, pyromellitic acid, trimethylolpropane and trimethyloloethane, and pentaerythritol may be used. The FR PET may be obtained by known polymerization techniques from either terephthalic acid or its lower alkyl esters (e.g. dimethyl terephthalate) and ethylene glycol or blends or mixtures of these. FR PEN may be obtained by known polymerization techniques from 2,6-naphthalene dicarboxylic acid and ethylene glycol. Representative types of FR additives include such things as 8% octa-bromo diphenyl and 4% antiomony trioxide.

In other embodiments, the preferred polyesters used are liquid crystalline polyesters that are naturally flame retardant. By a "liquid crystalline polyester" (LCP) herein is meant a polyester polymer that is anisotropic when tested using the TOT test or any reasonable variation thereof, as described in U.S. Pat. No. 4,118,372, which is hereby included by reference. One preferred form of LCP is "all aromatic", that is all of the groups in the polymer main chain are aromatic (except for the linking groups such as ester groups), but side groups that are not aromatic may be present. LCP useful as thermoplastic material in this invention has melting point up to 350° C. Melting points are measured per test method ASTM D3418. Melting points are taken as the maximum of the melting endotherm, and are measured on the second heat at a heating rate of 10° C./min. If more than one melting point is present the melting point of the polymer is taken as the highest of the melting points. A preferred LCP for this invention include corresponding grades of Zenite® available from DuPont and Vectra® LCP available from Ticona Co.

Method of Making a Folded Overlay Ply

In the following paragraph, numbers referenced as (40) to (50) pertain to FIG. 4A.

Figure 4A:
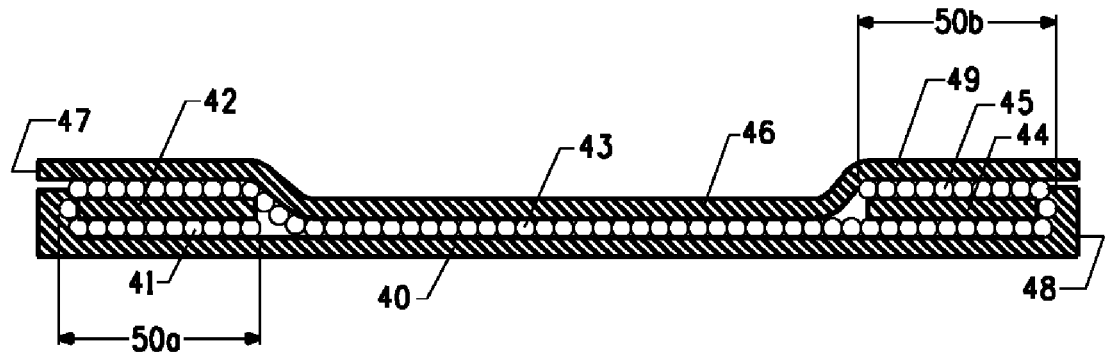
FIG. 4A shows a sectional view of a folded overlay embedded among pieces of elastomer prior to vulcanization.
Figure 4B:
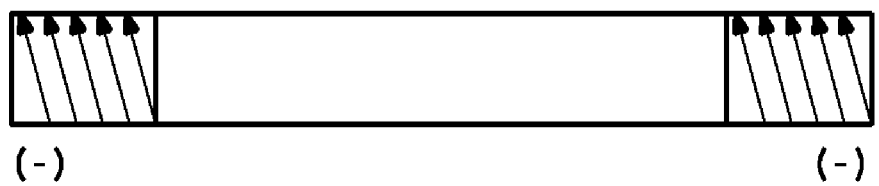
FIGS. 4B and 4C depict the cord orientation direction in the folded overlay of FIG. 4A.
Figure 4C:
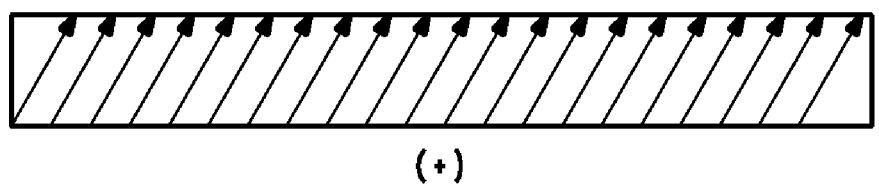

A method of forming a folded overlay ply in a tire assembly comprises the steps of:

(i) providing a tire sub-assembly comprising two beads, at least one carcass ply wrapped around each bead and at least one belt ply positioned on top of the carcass ply, (ii) placing a first rubber sheet (40) on top of the upper belt ply, (iii) positioning an overlay cord on top of the first rubber sheet a predetermined distance (50a) from the first end (47) of the region to be covered by the overlay, (iv) wrapping the overlay cord at the desired angle, orientation and deposition rate while traversing the cord towards the first end of the region to be covered by the overlay so as to form the base of the first fold (41) of the overlay, as shown in FIG. 4B at the left, (v) placing a second rubber sheet (42) on top of the deposited overlay cord section (41) formed in step (iv), (vi) wrapping the overlay cord at the desired angle shown in FIG. 4C and deposition rate in an orientation opposite to that of the orientation of the cord in the base of the first fold while traversing the cord towards the second end (48) of the region to be covered by the overlay so as to complete the first fold an form the base (44) of the second fold, (vii) placing a third rubber sheet (46) on top of the deposited overlay cord section 44 formed in step (vi), (viii) wrapping the overlay cord at the desired angle and deposition rate in an orientation similar to that of the orientation of the cord in the base of the first fold (41) while traversing the cord a predetermined distance (50b) towards the first end (47) of the region to be covered by the overlay so as to complete the second fold (45), as shown in FIG. 4B at the right, and (ix) placing a fourth rubber sheet (49) on top of the deposited overlay cord section (45) formed in step (viii).

By upper belt ply is meant the belt ply that is closest to the tread of the tire.

Cord deposition rate is sometimes referred to as cord wrap rate or lay-down rate.

Figure 4D:
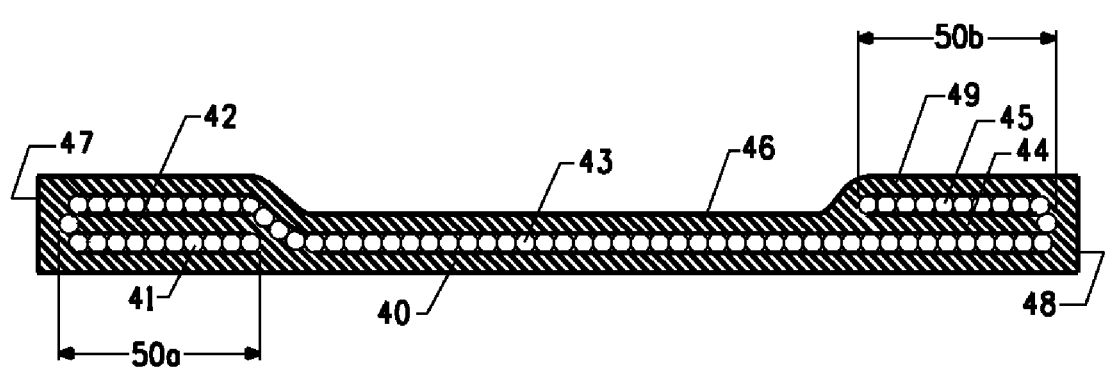
FIG. 4D shows a sectional view of a folded overlay and elastomer after vulcanization.

The gaps between the four distinct rubber components prior to vulcanization of the folded ply-rubber assembly can be seen in FIG. 4A. During vucanization, the rubber flows to fill the gaps between the rubber components resulting in a single piece of rubber structure as is seen in FIG. 4D.

Noise Reduction

A tire comprising an overlay having plies that are folded as described above and in FIGS. 2 and 3A-3C will emit less noise when compared to a tire comprising an overlay of the current art as shown in FIG. 1. A method of reducing noise in a tire is, therefore, one of providing a tire with at least one overlay in which the ends of the overlay are folded back.

It is believed that other benefits such as improved tire durability and reduced heat build up may also accrue with this invention.

EXAMPLES

Examples prepared according to the current invention are indicated by numerical values. Control or Comparative Examples are indicated by letters.

This invention was evaluated by producing a subscale specimen of a tire having a tire overlay comprising a folded ply as claimed and comparing it with a similar structure in which a conventional non-folded overlay ply is used. A method and specimen for evaluating tire noise has been described in U.S. patent application Ser. No. 61/821,759 to Lamontia et al filed May 10, 2013 (hereafter Test Method A) and is applicable for this evaluation.

The subscale specimens are cylindrical laminates (hereafter, cylinders). The cylinder has an internal diameter of 133 mm, a length of 229 mm and a thickness of 5.5 mm. There was also a 101 mm long tread band region (crown) in the center of the cylinder. The tire components represented in the cylinder were beads, an inner natural rubber liner, one carcass layer ply, two belt plies and an overlay ply. The components were assembled over a cylindrical tool on a lathe. The belt plies comprised conventional steel merge cords obtained from Bekaert, Akron, Ohio, each of merge cords comprising two cords of 3 mm diameter twisted together. The merge cords were deposited in the belt ply at a rate of 16 ends per inch and then encased in a natural rubber compound.

The cords of the overlay ply were merge cords comprising one ply of 1100 dtex (1000 denier) Kevlar® 29 and one ply of 1400 dtex (1270 denier) nylon 6,6. The two plies were twisted together at a 6.5 twist multiplier. The overlay ply cords were used in the inventive and comparative examples.

The carcass comprised 90 plies of 1500 denier polyester cords having a twist multiplier of 3.1. The cords were laid down at a rate of 28 ends per inch.

Cylinder Fabrication
1—A 0.05 mm thick inner liner of natural rubber was laid on the cylindrical tool on a lathe.
2—Carcass plies were placed on top of the inner liner.
3—Two cord beads each made from Kevlar® 29 yarn to form a 1500/4/5 structure were placed over the carcass layer about 0.5 inches from the end. The remaining rubber laminate outside of the bead was then folded up to cover the beads, just as in a real tire fabrication.
4—The belts were applied at a bias angle of 23 degrees on top of the carcass layer. The belt layer width was narrower than the cylinder to correctly represent the crown area width. Non-folded belts were used with the folded overlays. The overlay layer was fabricated on top of the belt plies as further described below.
5—A tread compound was applied on top of the overlay.
6—Cap layers made of rubber were applied between each layer.

All cords comprising Kevlar® filaments were treated with a resorcinol-formaldehyde latex (RFL) prior to assembly.

Example 1

The overlay layer was prepared in the following manner. All the natural rubber sheets were 0.05 mm thick. Referring to FIG. 41A, a first sheet of natural rubber (100) was placed around the circumference of the cylindrical tool on top of the steel belt plies. The first belt ply was positioned such that the cords were aligned at an angle of (+) 23 degrees. The second belt ply was positioned such that the cords were aligned at an angle of (−) 23 degrees.

An overlay cord was positioned 12.5 mm in from the left hand end of the belt and spirally wrapped at a wrap rate of 16 cords per inch in a circumferential direction around the belt towards the first end (47) of the assembly thus forming the base of a first fold (41). The spiral wrap orientation was in a minus direction (−) as shown by arrows in FIG. 4B. A second sheet of natural rubber (102) was placed over the base of the first fold (41). The cord was then spirally wrapped (43) at a wrap rate of 16 cords per inch over the belt ply towards the other end of the belt thus covering the full width of the belt ply. The spiral wrap orientation was in a plus direction (+) as shown by arrows in FIG. 4C. A third sheet of natural rubber (44) 12.5 mm wide was placed on top of cords (43) at the second end (48) of the assembly. The overlay cord was then traversed back and spirally wrapped at a wrap rate of 16 cords per inch for 12.5 mm over sheet (44) to form a second fold (45). A fourth sheet of natural rubber (46) was placed on top of cords (43) and (45). The finished structure was then covered tightly with several wraps of Nylon fabric.

The layup and tool was removed from the lathe and the assembly cured at 160 degrees C. in a steam vessel for 20 minutes after which time the cylinder was removed and tested for noise containment as per Test Method A.

Example 2

This example was prepared as per Example 1 except that the overlay folds 101 and 105 were 37.5 mm wide.

Comparative Example A

This example was prepared as per Example 1 except that the overlay cords were not folded back as in 101 and 105. Noise evaluation was also carried out as per Test Method A.

The noise evaluation results are summarized in Table 1. The MF range is the determined noise, in dB, at a mid-frequency of 500-1000 Hz. The HF range is the determined noise at a high-frequency of 1000-2000 Hz.

TABLE 1

| Example Reference | MF Range (db) | HF Range (db) |
|---|---|---|
| Comparative Example A | 122.7 | 120.4 |
| Example 1 | 120.7 | 119.4 |
| Example 2 | 121.3 | 119.5 |

Noise reductions of between 1 and 2 decibels were observed for both samples comprising folded ply overlays. A 1 db reduction is considered to be attractive in the automobile industry.

The invention claimed is:

1. A method of forming a folded overlay ply in a tire assembly comprising the steps of:
   (i) providing a tire sub-assembly comprising two beads, at least one carcass ply wrapped around each bead and at least one belt ply positioned on top of the carcass ply,
   (ii) placing a first rubber sheet on top of the upper belt ply,
   (iii) positioning an overlay cord on top of the first rubber sheet a predetermined distance in from the first end of the region to be covered by the overlay,
   (iv) wrapping the overlay cord at the desired angle, orientation and deposition rate while traversing the cord towards the first end of the region to be covered by the overlay so as to form the base of the first fold in the overlay,
   (v) placing a second rubber sheet on top of the deposited overlay cord section formed in step (iv),
   (vi) wrapping the overlay cord at the desired angle and deposition rate in an orientation opposite to that of the orientation of the cord in the base of the first fold while traversing the cord towards the second end of the region to be covered by the overlay so as to complete the first fold an form the base of the second fold,
   (vii) placing a third rubber sheet on top of the deposited overlay cord section formed in step (vi),
   (viii) wrapping the overlay cord at the desired angle and deposition rate in an orientation similar to that of the orientation of the cord in the base of the first fold while traversing the cord a predetermined distance towards the first end of the region to be covered by the overlay so as to complete the second fold, and
   (ix) placing a fourth rubber sheet on top of the deposited overlay cord section formed in step (viii).

* * * * *